(12) United States Patent
Then-Gautier et al.

(10) Patent No.: US 11,938,841 B2
(45) Date of Patent: Mar. 26, 2024

(54) SUPPLEMENTAL ENERGY GENERATION AND STORAGE FOR TRAINS

(71) Applicant: Ecolution kWh, LLC, Naples, FL (US)

(72) Inventors: Johnny Then-Gautier, Santo Domingo (DO); Johanne G. Medina Then, Naples, FL (US)

(73) Assignee: ECOLUTION KWH, LLC, Naples, FL (US)

( * ) Notice: Subject to any disclaimer, the term of this patent is extended or adjusted under 35 U.S.C. 154(b) by 875 days.

(21) Appl. No.: 17/011,891

(22) Filed: Sep. 3, 2020

(65) Prior Publication Data

US 2020/0398675 A1 Dec. 24, 2020

Related U.S. Application Data

(63) Continuation-in-part of application No. 16/876,010, filed on May 16, 2020, now abandoned, and a continuation-in-part of application No. 16/871,281, filed on May 11, 2020, now Pat. No. 11,485,235, said application No. 16/876,010 is a continuation of
(Continued)

(51) Int. Cl.
*B60L 7/10* (2006.01)
*F16D 55/226* (2006.01)
*H02K 7/102* (2006.01)

(52) U.S. Cl.
CPC .............. *B60L 7/10* (2013.01); *F16D 55/226* (2013.01); *H02K 7/102* (2013.01); *B60L 2220/44* (2013.01)

(58) Field of Classification Search
CPC ...... B60L 7/10; B60L 2220/44; F16D 55/226; H02K 7/102
See application file for complete search history.

(56) References Cited

U.S. PATENT DOCUMENTS 6,897,576 B2 5/2005 Ishikawa et al.
10,668,814 B1 6/2020 Then-Gautier
(Continued)

FOREIGN PATENT DOCUMENTS

CN 202463594 U 10/2012
CN 204383196 U 6/2015
(Continued)

OTHER PUBLICATIONS

Office Action dated Jul. 11, 2023 in counterpart application filed in Japan.
(Continued)

*Primary Examiner* — Robert J McCarry, Jr.
(74) *Attorney, Agent, or Firm* — Patzik, Frank & Samotny Ltd.

(57) ABSTRACT

The invention relates to the supplemental generation of energy from operation of a train, and specifically to the generation of energy in connection to the rotation of disc brake rotors in combination with generators. Rotation of the disc brake rotors creates rotational energy that is transmitted to the generators, which then transmits the energy to a series of batteries for storage. The batteries may be stored in the platform for the train and/or within the train car itself. Energy from the batteries may be utilized by removal of the batteries from the train or through a number of outlets, sockets or connectors associated with the train car or platform.

24 Claims, 17 Drawing Sheets

Related U.S. Application Data application No. 16/726,862, filed on Dec. 25, 2019, now abandoned, said application No. 16/871,281 is a continuation of application No. 15/858,848, filed on Dec. 29, 2017, now Pat. No. 10,668,814.

(60) Provisional application No. 63/024,888, filed on May 14, 2020, provisional application No. 62/784,904, filed on Dec. 26, 2018, provisional application No. 62/440,775, filed on Dec. 30, 2016.

(56) References Cited

U.S. PATENT DOCUMENTS

| | | |
|---|---|---|
| 2008/0067018 A1 | 3/2008 | Smith et al. |
| 2010/0282122 A1 | 11/2010 | Mai |
| 2012/0091724 A1 | 4/2012 | Bodenstein |
| 2013/0093189 A1 | 4/2013 | Lim |
| 2013/0147441 A1 | 6/2013 | Lee et al. |
| 2013/0154363 A1 | 6/2013 | Lim |
| 2013/0167752 A1 | 7/2013 | Barbee |
| 2014/0188699 A1 | 7/2014 | Langgood et al. |
| 2016/0236658 A1 | 8/2016 | Rozza |
| 2017/0349039 A1 | 12/2017 | Rayner |
| 2018/0086355 A1 | 3/2018 | Pyper |
| 2018/0093655 A1 | 4/2018 | Healy et al. |
| 2019/0003534 A1 | 1/2019 | Rodriguez |
| 2019/0011000 A1 | 1/2019 | Welin |

FOREIGN PATENT DOCUMENTS

| | | | |
|---|---|---|---|
| CN | 208277869 U | 12/2018 | |
| JP | H05-184014 A | 7/1993 | |
| JP | H8-152836 | 6/1996 | |
| JP | H10-76921 | 3/1998 | |
| JP | 2007-030750 A | 2/2007 | |
| JP | 2012-62877 | 9/2010 | |
| JP | 2015-39291 | 2/2015 | |
| JP | 2017-89746 | 5/2017 | |
| JP | 2017-170971 A | 9/2017 | |
| KR | 20140049715 A * | 10/2012 | ................ B60L 7/10 |
| WO | 2020069737 A1 | 4/2020 | |

OTHER PUBLICATIONS

Search Report and Written Opinion dated Jan. 13, 2021 in PCT/US2020/49251.

Office Action dated Sep. 27, 2023 in Japanese Patent Application No. 2022-568947.

* cited by examiner

SUPPLEMENTAL ENERGY GENERATION AND STORAGE FOR TRAINS

This application is a continuation-in-part of U.S. non-provisional patent application Ser. No. 16/871,281, filed on May 11, 2020, which is a continuation of U.S. non-provisional patent application Ser. No. 15/858,848, filed on Dec. 29, 2017, and which issued on Jun. 2, 2020 as U.S. Pat. No. 10,668,814, which claims benefit to U.S. provisional patent application Ser. No. 62/440,775, filed on Dec. 30, 2016, the disclosures of which are herein incorporated by reference in their entireties. This application also claims benefit to U.S. provisional patent application No. 63/024,888 filed on May 14, 2020, the disclosure of which is herein incorporated by reference in its entirety. This application is also a continuation-in-part of U.S. non-provisional patent application Ser. No. 16/876,010, filed on May 16, 2020, which is a continuation of U.S. non-provisional patent application Ser. No. 16/726,862 filed on Dec. 25, 2019, which claims benefit to U.S. provisional patent application Ser. No. 62/784,904 filed on Dec. 26, 2018, the disclosures of which are herein incorporated by reference in their entireties.

The following documents and references are incorporated by reference in their entirety, Erlston et al (U.S. Pat. Appl. No. 2008/0078631) and Bodenstein et al (U.S. Pat. Appl. No. 2012/0091724).

FIELD OF THE INVENTION

The present invention relates to the supplemental generation of energy from operation of a vehicle, and specifically to the generation and storage of energy from the movement of a train in combination with generators for converting rotational energy into electrical energy for storage and subsequent use.

BACKGROUND OF THE INVENTION

The rail system in the United States alone comprises about 140,000 miles of rail for use to transport freight and passengers. The vast network of railways provides an efficient way to move freight (both imports and exports) around the continental United States. Statistics from 2017 indicate that trains deliver 5,000,000 tons of freight and 85,000 passengers per year. As of 2018, railways accounted for about 28% of all freight movement by ton-miles and more than 500,000 miles of passenger travel.

Trains are also generally a more energy efficient mode of freight transportation than trucking and other means with statistics showing that freight trains can average about 470 miles per freight-ton. As a result, despite the higher percentage, moving freight by rails only accounts for about 2% of transport-related emissions. For these reasons, among others, federal forecasts indicate that freight traffic is likely to increase substantially over the next several decades.

Despite all this, railway companies still face difficulties and obstacles in being successful. Among other things, as the rails are privately owned by the rail companies, the costs to maintain them can be substantial. According to recent studies, freight railroads spend more than forty cents on the revenue dollar on capital expenditures and maintenance (each accounting for about one half of the cost or about twenty cents on the dollar). This is significantly higher than other industries and manufacturers, where capital expenditures average about 3% of revenue.

As for passenger rails such as Amtrak and Metra, most passenger rail companies do not own most of the stations and rail they utilize. There are also significant costs in maintenance of equipment. As a result, there are often very low, if any, profit margins and many passenger carrying train systems and companies are highly subsidized and struggle to economically compete with other forms of personal transportation. As an example, Amtrak has lost money every year since its formation in 1971.

While trains are a more environmentally friendly means of transportation, in view of global environmental concerns regarding other types of energy, there is still a need and demand to do more to utilize cleaner energy and reduce emissions.

Accordingly, it is an object of the present invention to provide an effective and efficient system and method for generating and storing power seamlessly as a byproduct from the operation of trains.

Another object of the present invention is to provide a way to utilize native operation of trains to generate and store power to generate income.

It is another object of the present invention to provide a way to utilize trains to generate and store environmentally friendly power.

These and other objects and features of the present invention will become apparent in view of the present specification, drawing and claims.

SUMMARY OF THE INVENTION

The present invention relates to the generation of energy through operation of a train. In one embodiment, the invention comprises an energy generation system that is operationally attached to the axles in the train bogie. The energy generation system utilizes a motion transmission mechanism (chain, V-belt or notched timing style belt, continuously variable transmission, mechanical gearing or a gearbox or a fluid based torque converter) that engage disc brake rotors or any other rotating members attached to the train's axles to transmit rotational energy to generators through the use of sprockets and associated shafts. The generator then transmits that energy to an energy storage unit such as a plurality of batteries. In an alternate embodiment, the sprockets directly engage the disc brake rotors. A bracket may be utilized to retain the sprocket in place relative to the disc brake. Alternatively, the sprocket may be positioned over and/or attached to the disc brake caliper.

The batteries may stored beneath or within the train wagon or platform and/or in the train cars themselves. Racks may be utilized to allow batteries to be stacked vertically to increase the amount of storage therein. Energy stored in the batteries may be utilized by removing the batteries after they are charged or through adapters or connectors on the train cars to allow equipment or vehicles to be connected thereto for charging.

In order to help retain the generators in place within the train bogie, a support frame may be utilized. The support frame may comprise a pair of shafts or rods that extend between opposing bogie side frame members. A traverse frame member is attached or connected to the pair of shafts and extends parallel to the disc brake rotor. The traverse frame member may comprise a top frame member, a lower frame member and a pair of end members that are attached together to allow the axles to extend through a central hole and freely rotate therein. The frame members include openings that are sized to rotationally receive the shaft. Bushings may be utilize to facilitate rotation of the shafts in the openings. Bracket members on or attached to the generators and frame members allow the generators to be removably connected to the frame.

Additional aspects and advantages of the invention are further described below, parts of which will become apparent from the descriptions below or be learned from the practice of the invention.

BRIEF DESCRIPTION OF THE DRAWINGS

The above and/or additional aspects and advantages of the invention shall be obvious and easily understood from the following descriptions of the embodiments in combination with the appended drawings, where.

Figure 1:
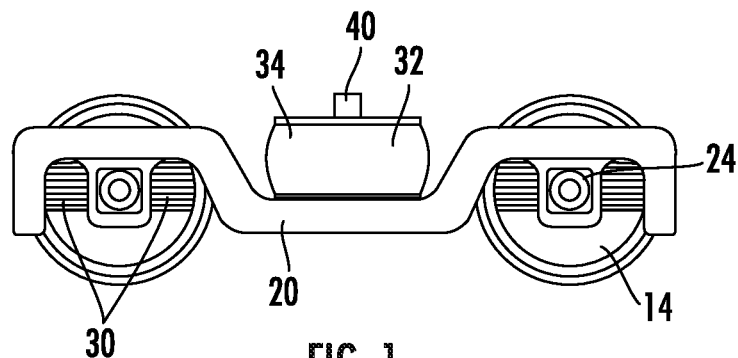
FIG. 1 is a side elevation view of a basic train bogie with a pair of axles.

The preceding description and drawings merely explain the invention and the invention is not limited thereto, as those of ordinary skill in the art who have the present disclosure before them will be able to make changes and variations thereto without departing from the scope of the present invention.

DETAILED DESCRIPTION OF THE INVENTION

While the present invention is susceptible of embodiment in many different forms, there is shown in the drawings and will herein be described in detail specific embodiments, with the understanding that the present disclosure is intended as an exemplification of the principles of the present invention and is not intended to limit the invention to the embodiment disclosed.

Figure 2:
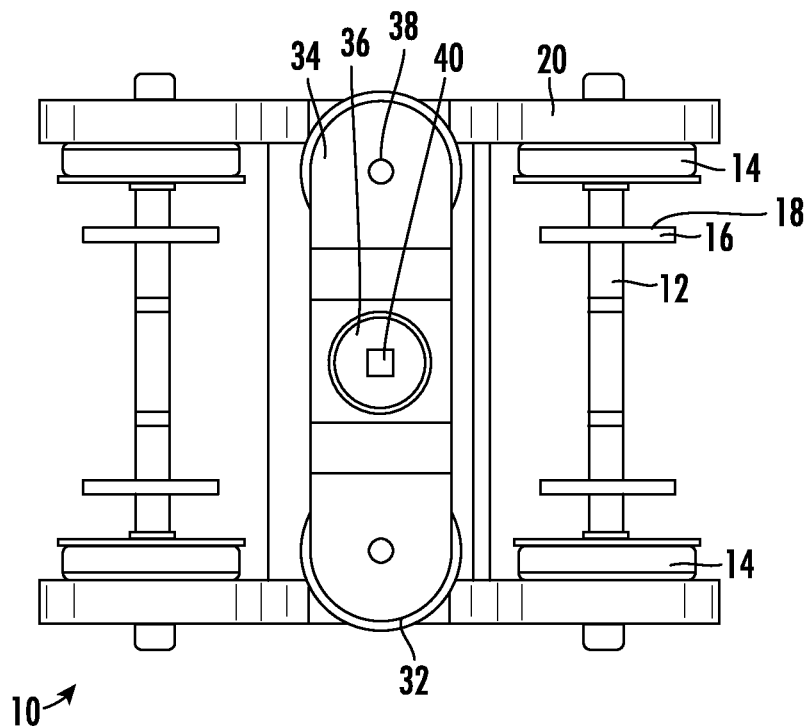
FIG. 2 is a top plan view of the train bogie and wheels of FIG. 1.
Figure 3:
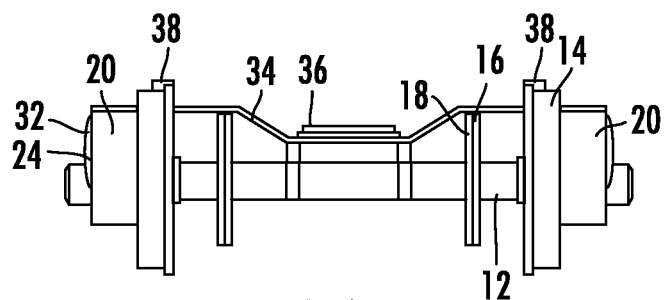
FIG. 3 is a front elevation view of the train bogie and wheels of FIG. 1.

Referring to FIGS. 1 through 3, basic components from a train bogie 10 as presently embodied in the prior art are shown in connection with a pair of axles 12 each with a pair of wheels 14 for engaging the rail (not shown). On each axle 12 are a pair of discs 18 that allow disc brake rotors 16 to be attached thereto for stopping or slowing the train when calipers are engaged. The bogie 10 itself comprises a pair of side frame members 20 that are connected together by a bogie transom 22. The axles 12 are rotationally connected relative to the bogie side frame members 20 through axles boxes 24.

A pair of springs 30 proximate each wheel extend between the bottom of the axle box 24 and the underside of the side frame member 20 to act as the primary suspension for the train bogie 10 and what it is carrying. Secondary suspension members in the form of air springs 32 are shown on the bogie transom 22. A bolster 34 extends over the air springs 32 and includes a center plate 36 with a central pivot member 40 to connect to a railcar or platform. Pins 38 may extend from atop of the bolster 34 to facilitate connection with the railcar 322 or platform 320. While one embodiment of a train bogie is shown and disclosed, it is appreciated that other train bogies having varying parts or different numbers of axles and wheels may be used and not depart from the scope of the invention.

Referring now to FIGS. 4 through 10, one embodiment of the energy generation system 100 of the present invention is shown as having two pair of disc brake rotors 116, four pair of generators 102, support frames 104, mechanical couplers 106, chains 108 and connecting members 110. The energy generation system 100 is designed to fit within the frame of the train bogie for use with existing or new bogies. While the energy generation system is shown and disclosed as used in connection with a disc brake for each wheel, it is appreciated that it may be utilized with selected disc brakes on the bogies and not depart from the scope of the present invention. The energy generated may go to an energy storage system 310 for subsequent use.

Figure 10:
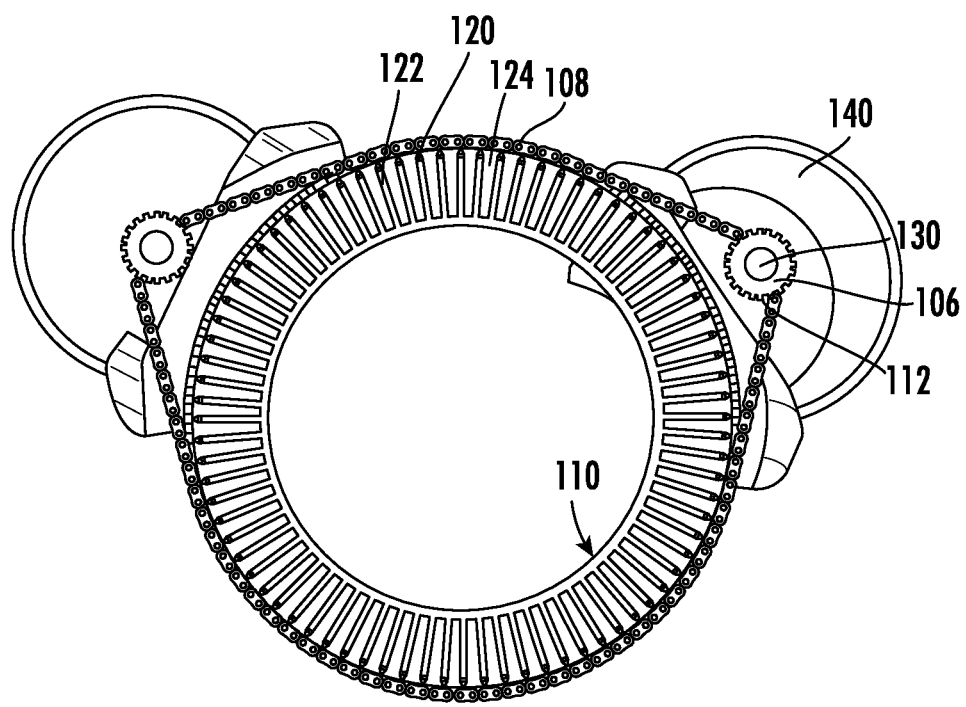
FIG. 10 is a cross-sectional view of the components of the energy generation system of FIG. 9.

Referring to FIG. 10, one embodiment of the disc brake rotor 116 shows it as being annular in shape with slots 124 circumferentially extending therethrough. The disc brake rotor 116 is sized and shaped to fit over and be attached to the disc 18 on the axle 12 so that it will rotate with the rotation of the wheels 14.

Figure 11:
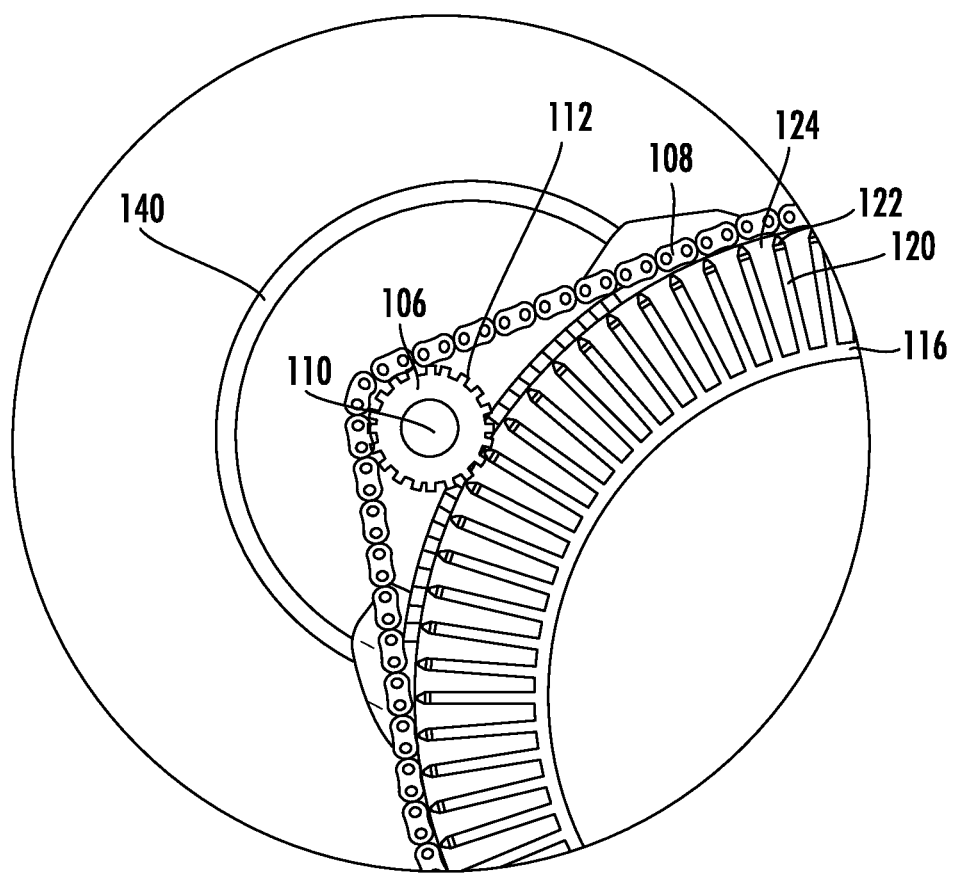
FIG. 11 is a cross sectional view showing another embodiment of components of the energy generation system of the present invention showing the sprocket directly engaging the disc brake rotor.
Figure 13:
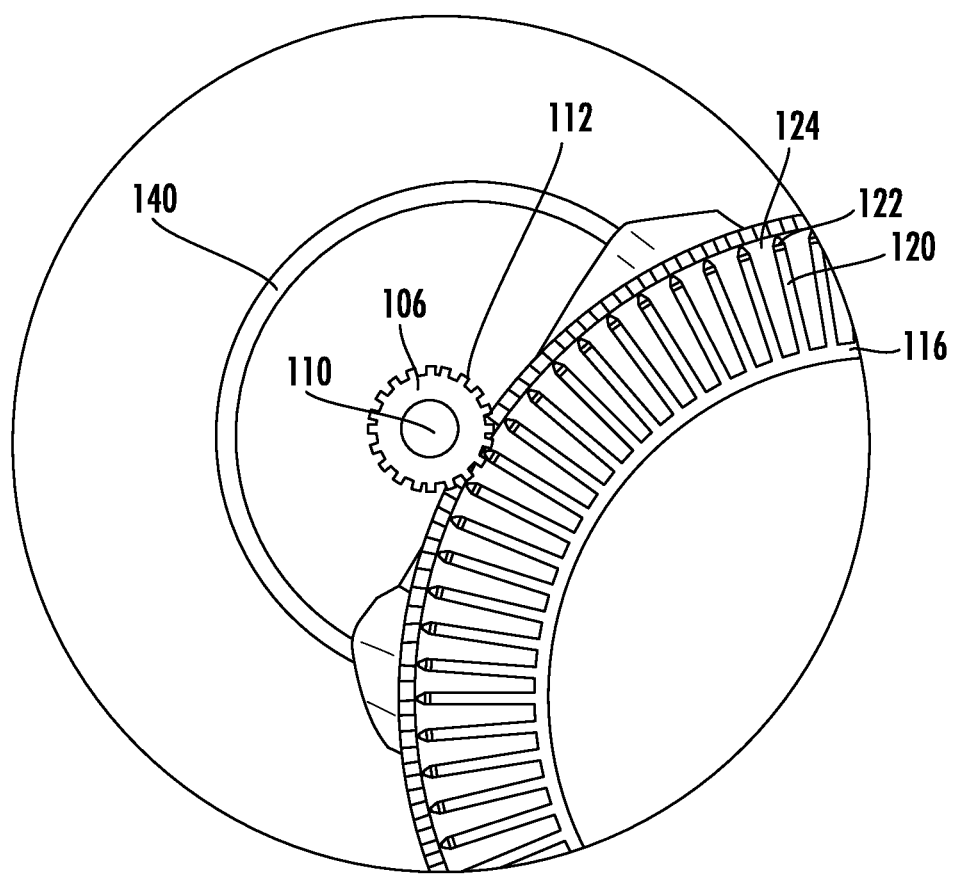
FIG. 13 is a cross sectional view showing another embodiment of components of the energy generation system of the present invention showing the sprocket directly engaging the disc brake rotor and the use of a chain.

The mechanical coupler 106 is shown as a sprocket or gear having a plurality of teeth 112 spaced apart its circumference and sized to engage corresponding openings 128 in a roller chain 108 that is placed around the edge of the disc brake rotor 116, facilitating the rotation. In order to facilitate the mechanical connection of the chain 108 to the disc brake rotor 116, the spokes or elongated members 120 forming the slots 124 have tapered ends 122 for engaging the openings 128 in the links of the chain 108. Furthermore, while a chain is shown and disclosed, it is appreciated that other rotation conveyors or motion transmission mechanisms such as, but not limited to, V-belts or notched timing style belts, continuously variable transmissions, mechanical gearing or a gearbox or a fluid based torque converter may be utilized. While tapered ends are shown and disclosed, it is appreciated that the chain or other rotational conveyor may engage the disc brake rotor 116 through friction or other known connectors or connecting methods. Among other things, various connectors may be fixed or positioned within a channel 126 extending about the circumference of the disc brake rotor 116. Further, while a chain 108 is shown and disclosed, as shown in FIG. 13, it is appreciated that the mechanical coupler 106 may directly engage the slots 124 formed in the disc brake rotor 116 without the need for a chain. It is also appreciated, as shown in FIG. 11, that a chain 108 may be utilized to facilitate rotation of the mechanical coupler 106 with the disc brake rotor 116.

While a disc brake is shown and disclosed, it is appreciated that the energy generation system of the present invention may be used with other rotating members that could be attached or coupled to the train's axle (i.e., rotate with the wheels) including, but not limited to, other circular or annular members attached to the axles. If other components are used, it is appreciated that they could be customized to engage a mechanical coupler or permit a chain or other rotational conveyor to wrap around and engage the component to provide for the generation of energy as disclosed herein.

The mechanical coupler 106 is connected to the connecting member, shown as a shaft 110, through its center. In order to maintain the coupler 106 in position relative to the disc brake rotor 116, a bracket 140 may be used. Similar to the disc caliper in operation, the bracket 140 remains parallel to the disc brake rotor 116 surface. In order to not interfere with the operation of the disc brake, the coupler 106 and brackets 140 are placed apart from the caliper about the disc brake rotor 116.

Referring again to FIG. 7, the bracket 140, having a hollow interior defined by a pair of side walls 142, is positioned astride of the disc brake rotor 116. Opposing holes 144 extend through the side walls 142 for receiving a portion of the shaft 110 therethrough to allow the coupler 106 to be aligned with the slots 124. It is appreciated that the bracket may only have a hole 144 on one side wall. Bushings may be inserted into the holes 144 to facilitate rotation of the shaft 110. While a separate bracket is shown and disclosed, it is appreciated that to conserve space or provide for ease of installation, the caliper may act as one of the brackets for the sprocket, either for the sprocket itself or to permit the chain to pass through to engage the sprocket.

The shaft 110 is mechanically connected to the generator 102 for generating energy in the form of either alternating current ("AC") or direct current ("DC"). In one embodiment, the generators are alternators. The energy is then transmitted and/or stored in an energy storage component or system 310 on or in the train car, platform or bogie, or in the vehicle's energy system. This may include feeding into the alternator/battery bus, and/or into a separate vehicle electronics circuitry. While two generators are shown per disc brake, it is appreciated that one or more generators may be utilized per disc brake.

Figure 12:
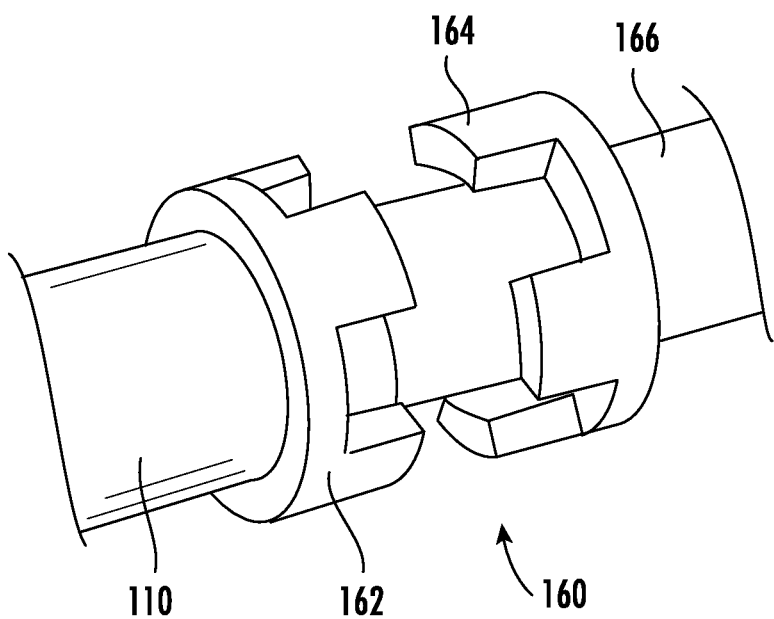
FIG. 12 is a partial perspective view of one embodiment of a clutch for use with the energy generation system of the present invention.

Referring now to FIG. 12, the energy generation system 100 may be equipped with a clutch 160 to only generate energy when desired or needed. The positive clutch 160 shown in the figures includes a jaw member 162 on the end of the shaft 110 and a corresponding jaw member 164 positioned on a driven shaft 166 for the generator 102. When the clutch 160 is engaged, the corresponding jaw members 162,164 are engaged to allow for the transmission of the rotational movement to the generator 102. When disengaged, the shaft 110 will rotate without transmitting energy to the generator 102. Similarly, the generation of energy may be electronically shunted, so the load is minimal when not generating energy.

Figure 4:
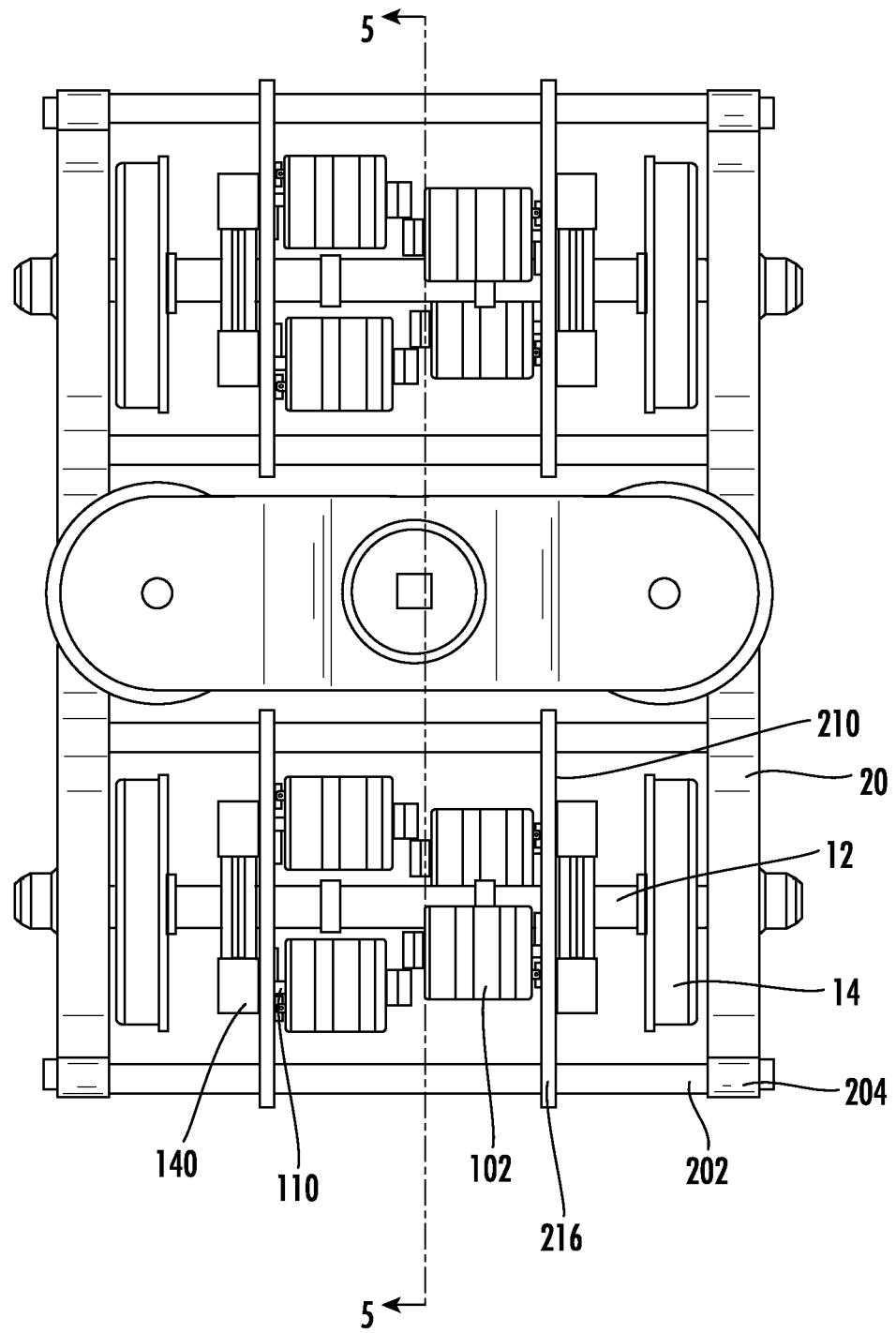
FIG. 4 is a top plan view of the energy generation systems of the present invention installed on the train bogie of FIG. 2.
Figure 5:
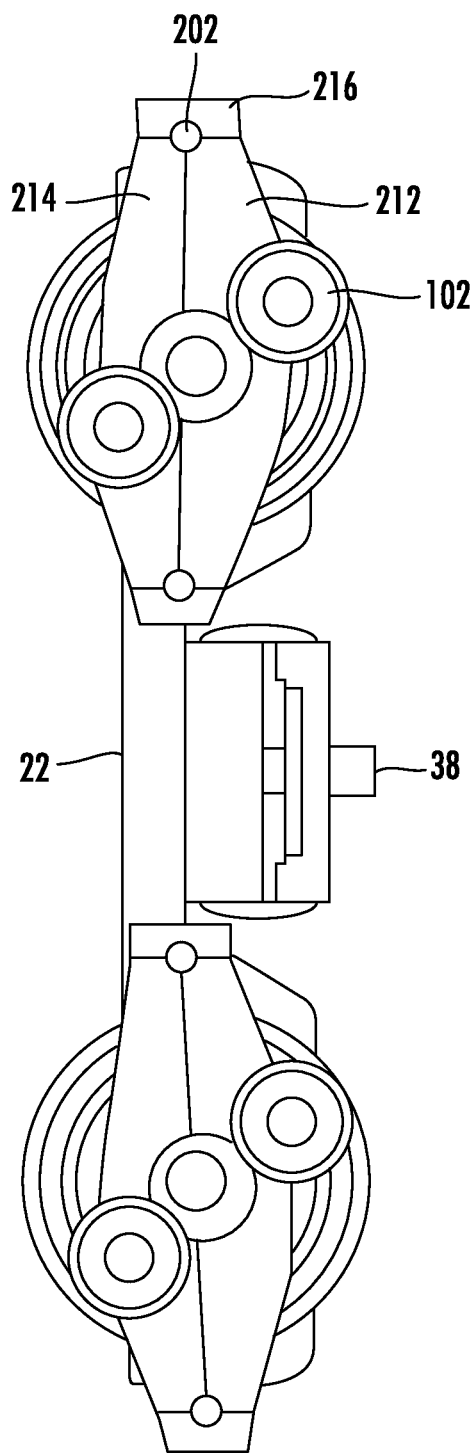
FIG. 5 is a cross-sectional view of the energy generation system and train bogie taken along line 5-5 of FIG. 4.
Figure 6:
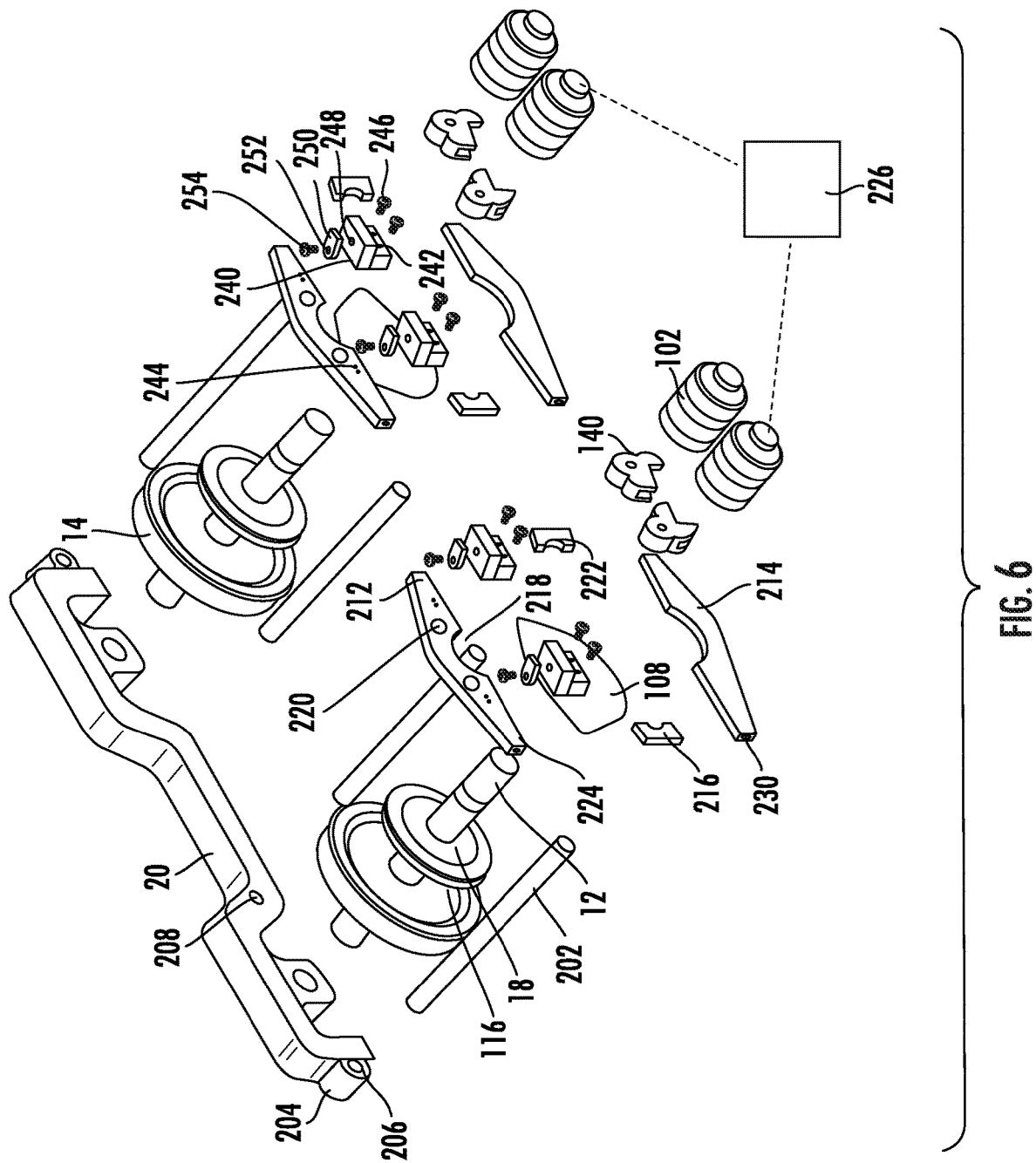
FIG. 6 is a partial exploded view of the energy generation system and train bogie of FIG. 4.
Figure 7:
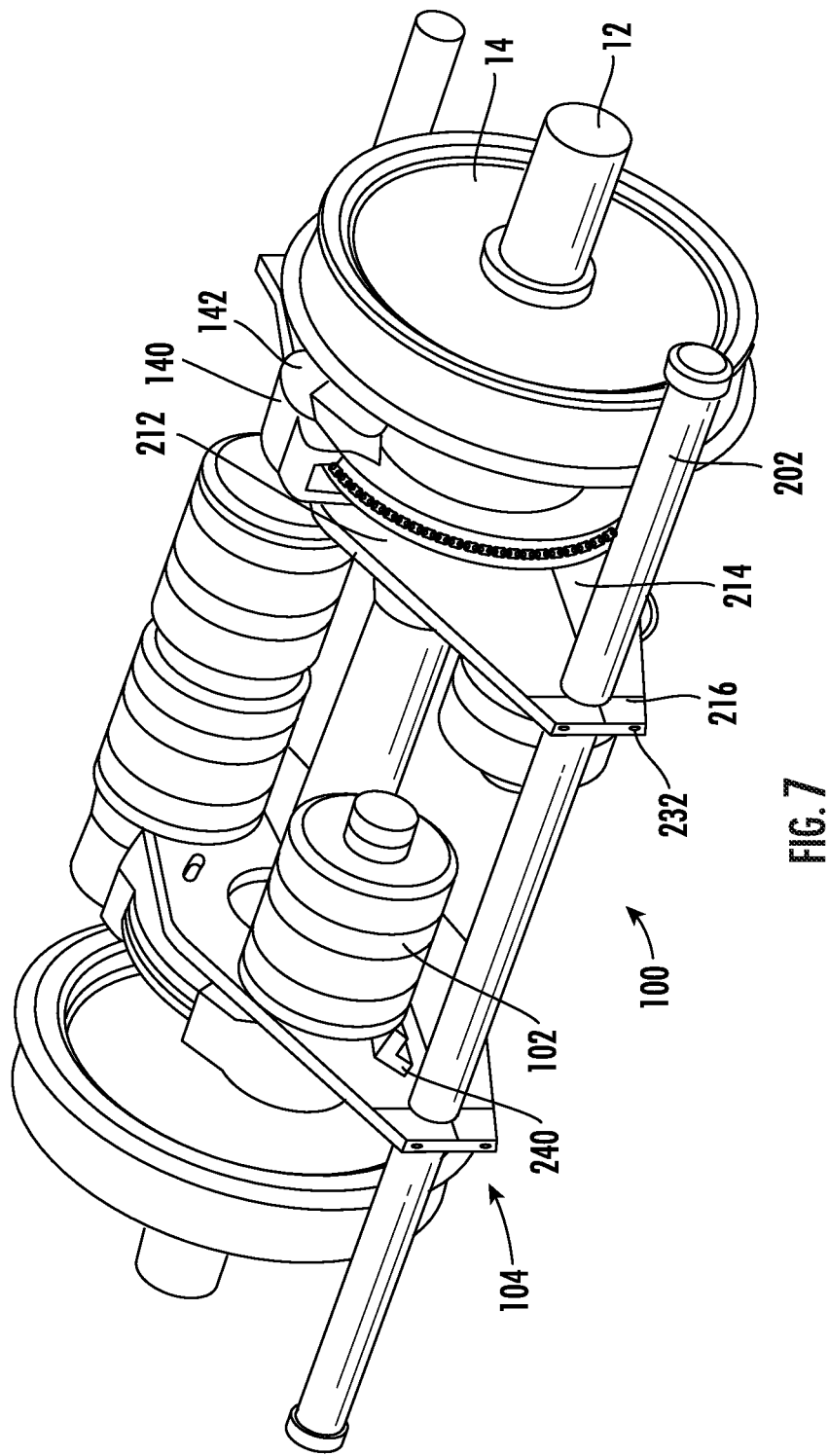
FIG. 7 is a front perspective view of the energy generation system of the present invention with a pair of wheels on an axle.
Figure 8:
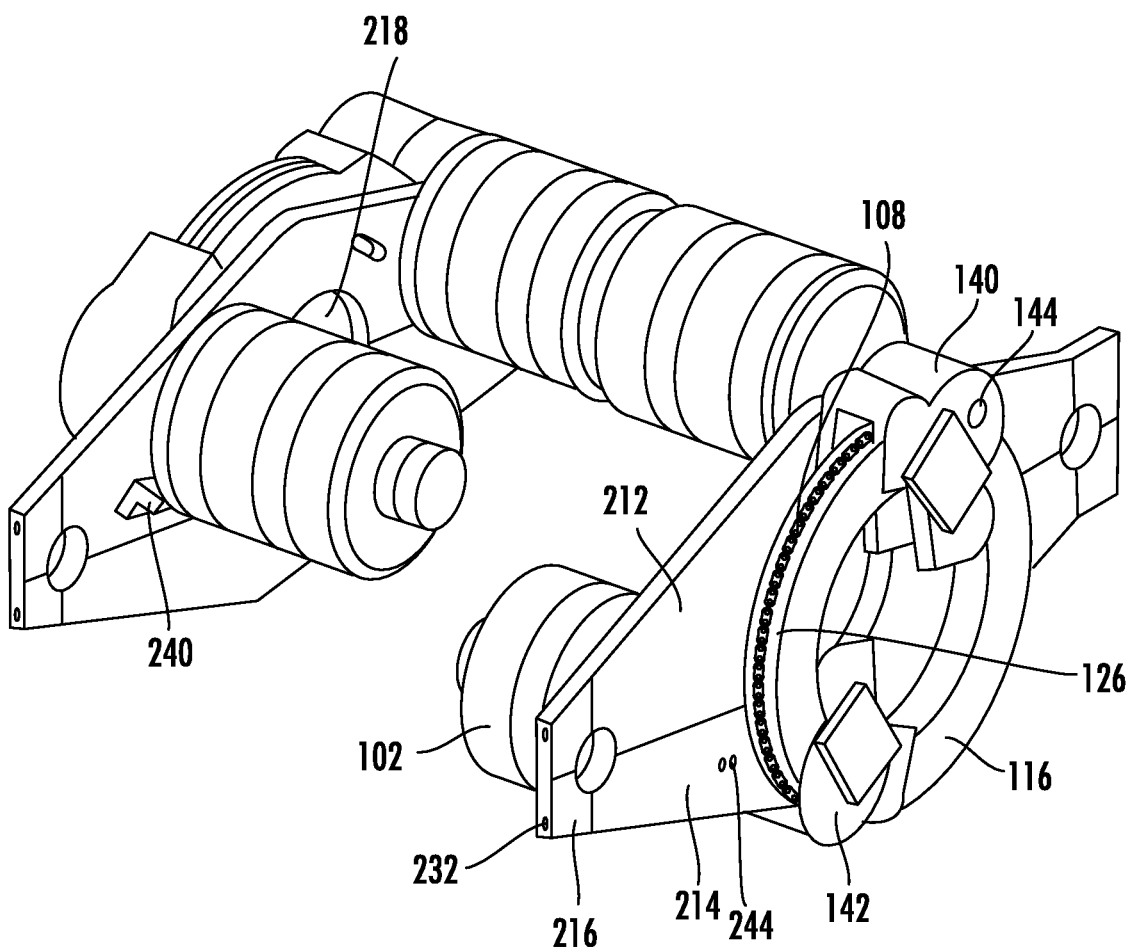
FIG. 8 is a perspective view showing components of the energy generation system of the present invention shown in FIG. 7.
Figure 9:
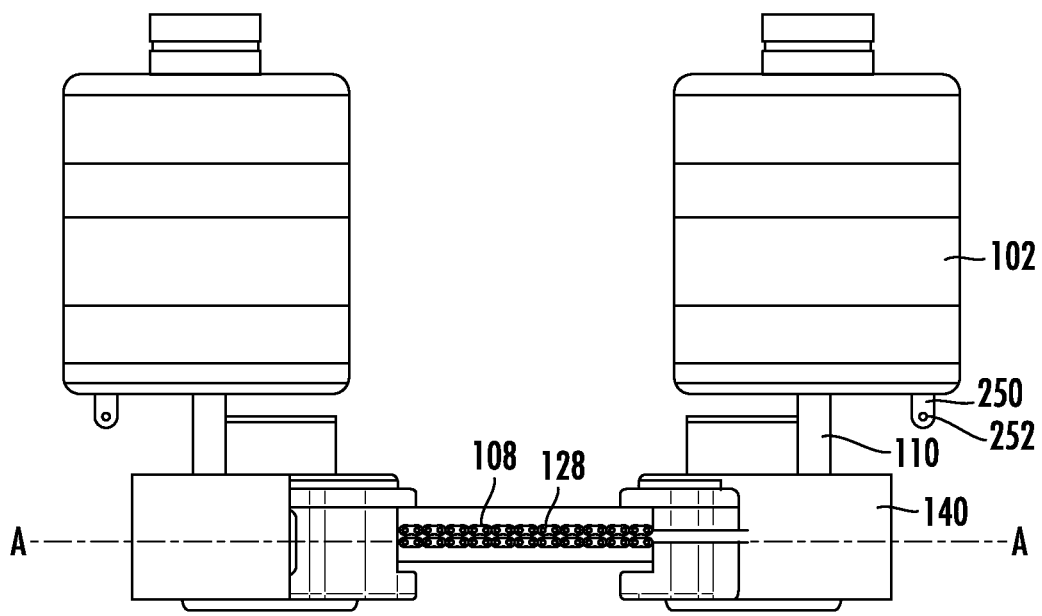
FIG. 9 is a top plan view of components of the energy generation system of the present invention.

In order to maintain the generators 102 in place relative to the disc brake rotor 116, a support frame 104 may be utilized. Referring to FIGS. 4, 6 and 7, one embodiment of the support frame 104 is shown having a pair of rods 202 extending between the side frame members 20 of the train bogie frame. The rods 202 may be connected to the side frame members 20 through corresponding brackets 204 having holes 206 therein, and/or through holes 208 on the interior portion of the side frame members 20 themselves. While brackets and holes are shown and disclosed, it is appreciated that the rods or other connecting members may be attached to or relative to the side frame member through other known means.

A pair of traverse frame members 210 extend proximate and parallel to the respective disc brake rotors 116 and are attached or otherwise connected to the rods 202. In order to facilitate installation, the traverse frame members 210 include an upper frame member 212, a lower frame member 214 and a pair of end members 216. Each of the upper and lower frame members 212,214 has a corresponding concave central opening 218 to permit the axle 12 to extend therethrough and freely rotate. Bushing members may be utilized in the central concave opening to facilitate rotation and protect the upper and lower frame members.

Circular openings 220 extend through one or more of the upper and lower frame members 212,214 to accommodate portions of the shafts 110 and allow them to freely rotate therein. Bushings may be utilized to facilitate the rotation of the shafts and protect the frame members from abrasion and wear. The openings are offset to not interfere with the brake disc caliper or other train components. It is appreciated that the openings may be moved within or between the frame members depending upon the particular structure of the train bogie and the train components therein.

Each of the end members 216 has an opening 222 sized and shaped to receive the rod 202 or a portion therethrough. If the rods 202 are circular or arcuately shaped, or if desired for rods of other cross-sectional shape, a corresponding opening formed by cut-away portions 224 in the opposing corners of the upper and lower frame members 212,214 may be utilized. Once the frame members 212,214,216 are positioned about the rod 202, they may be attached to one another through bolts, rivets or other connectors through corresponding holes 230 and 232 therethrough. It is appreciated that the frame members may also be attached to each other and/or the rods or connected using welding or other known means. While shown as separate pieces, it is appreciated that the upper and lower frame members may have openings therethrough for receiving and attaching to the rods, wherein they may be positioned prior to installation of the rods in the train bogie.

The generators 102 may be attached to the support frame 104 to provide support for the energy generation system 100. One embodiment showing the support frame attaching to the generators is shown in FIG. 6 as having L-shaped brackets 240 having a pair of holes 242 for attaching to frame members 212,214 through corresponding holes 244 using bolts 246. While the bracket is shown as L-shaped and attached using bolts, it is appreciated that it may be alternatively sized and shaped and may be integral with the end members or otherwise connected thereto using other known means.

A bracket or connecting member 250 may be integral with or otherwise attached using bolts, welding or other known means to the generator 102. The bracket 250 includes a hole 252 that aligns with hole 248 to allow a bolt to pass therethrough to attach the brackets 240, 250 and thus the generator 102 and frame members 212, 214 together.

It is further appreciated that depending on the structure of the train bogey, the generator may be offset from the location of the disc brake rotor. One example of the generator 102 being offset from the disc brake rotor 116 is shown as having a plate or base member 400 for holding or attaching to the generator 102. The plate 400 may be attached to rod 202 through brackets 402.

Figure 20:
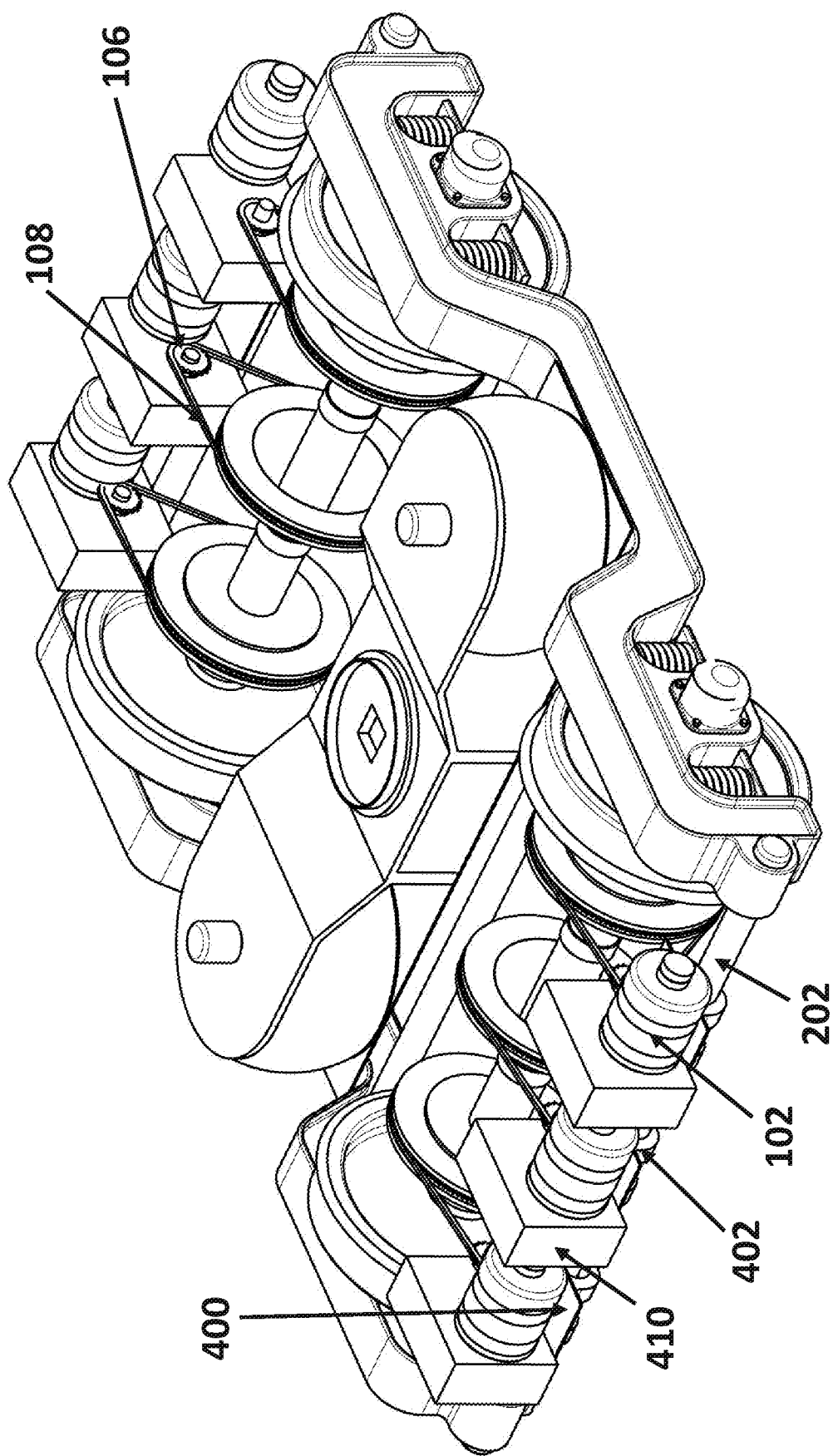
FIG. 20 is a perspective view showing another embodiment of the energy generation system of the present.
Figure 21:
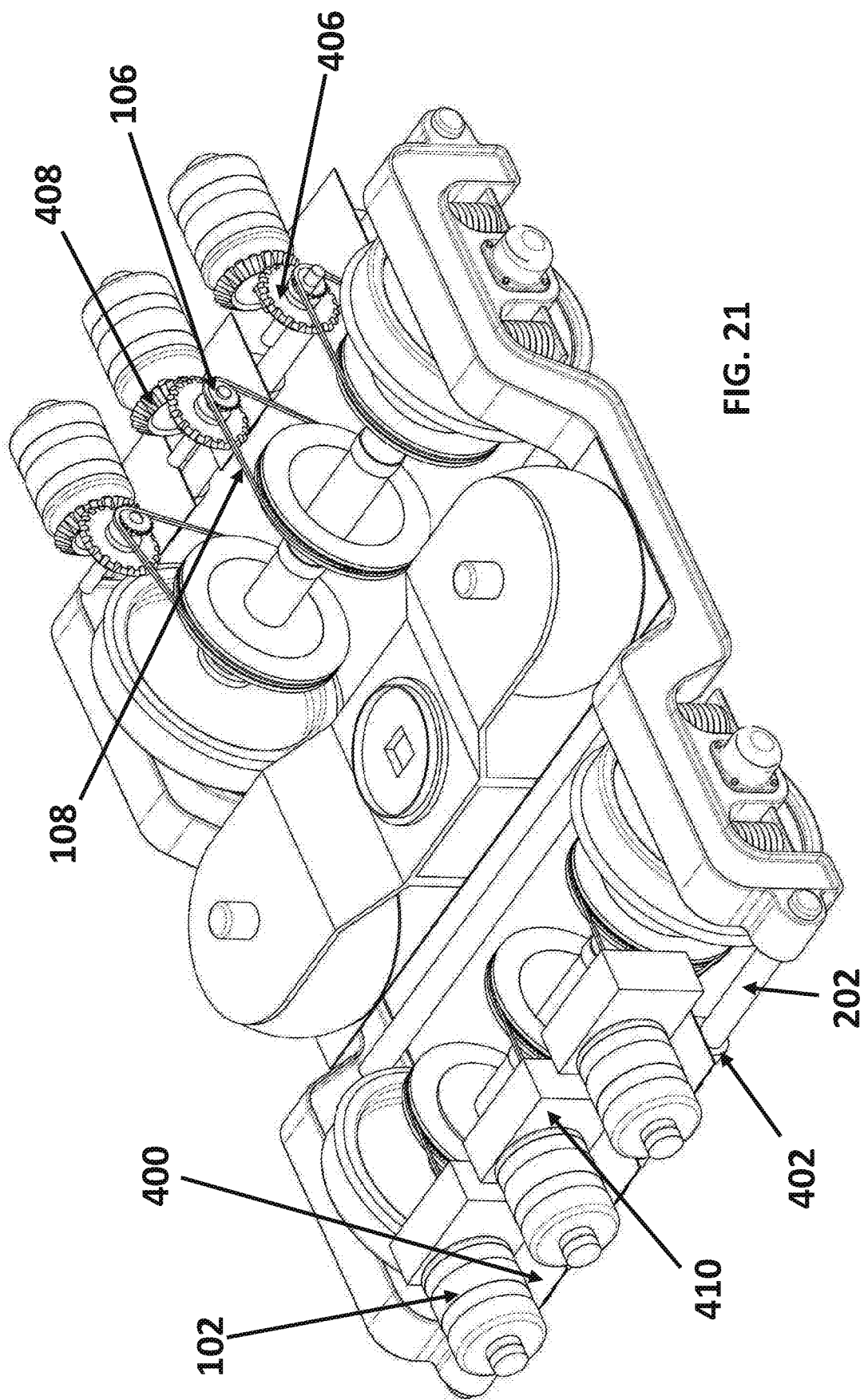
FIG. 21 is a perspective view showing another embodiment of the energy generation system of the present.

Referring to FIG. 20, the system may also include a transfer case 410 to allow the generator 102 to be mounted at an angle from the sprocket 106 and shaft 110 if desired. FIG. 21 illustrates the transfer case 410 and the generator 102 attached thereto being perpendicular to the brake disc rotor 116.

The transfer case 410 also may include gearing to modify the drive ratio as desired. A continuous variable transmission or fixed gear transmission also may be utilized to alter the drive ratio as the change changed speed. An example of a gear system for use with the energy generation system is shown as having a first bevel gear 406 that rotates about shaft 410 and engages bevel gear 408 that rotates about shaft 110 to generator 102. It is appreciated that different sizes, types and numbers of gears may be used depending on the space and desired output.

In operation, one or more tapered ends 122 of the spokes 120 in the disc brake rotor 116 engages openings in the chain 108. As the disc brake rotor 116 is rotated, the chain 108, and thus the sprockets 106 and shafts 110 will also rotate as the teeth 112 of the sprockets 106 are moved out of and into engagement with the openings 128 in the chain 208. Thus, as the wheel 14 moves, the disc brake rotor 116 moves, and the shafts 110 going to the generators 102 move thereby creating energy to be stored in the train. If desired, the clutches 160 may be utilized to selectively permit control of the transmission of the energy to the respective generators 102.

It is appreciated that the ratio between the size of the sprockets 106 and the disc brake rotor 116 or other rotational component may vary to increase or optimize energy generation. As an example, one ratio between the diameter of the disc brake rotor 116 for which the chain 108 is wrapped around to the sprocket or coupler 106 is 1:9, wherein when the disc brake rotor 116 rotates once, the sprocket 106 and shaft 110 attached thereto will rotate nine times. This ratio may be employed to increase energy generation for trains that travel at a higher speed (e.g., between 35 mph and 65 mph). It is appreciated other ratios will have different ideal ratios, defined by the variables including the type of generator used and the average speed of the train.

Energy generated by the energy generation system 200 may be sent to one or more energy control units or electrical convertors that then transmit the energy to a plurality of batteries 310 located within compartments or storage areas on the train car 322 and/or wagon or platform 320. The electrical convertor and system regulates the electrical output based on vehicle condition, battery charge levels, battery or device draw on the battery and ambient conditions to enhance energy generation. While a variety of different batteries may be utilized, one example of a battery that may be used with the present invention is a Panasonic® battery with a 5.3 kWh storage capacity.

Figure 14:
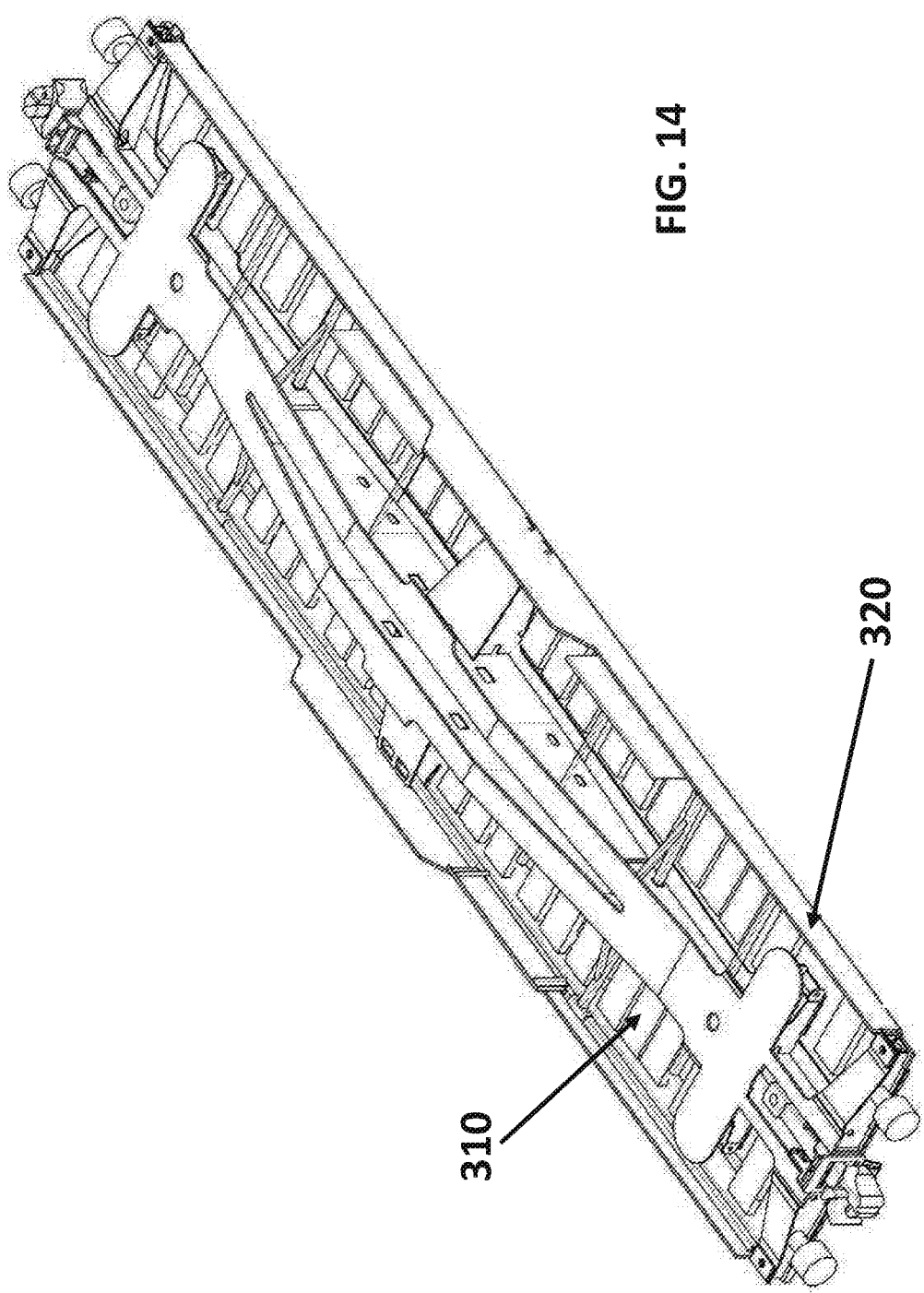
FIG. 14 is bottom perspective view of one embodiment of a storage arrangement for batteries with a train platform.
Figure 15:
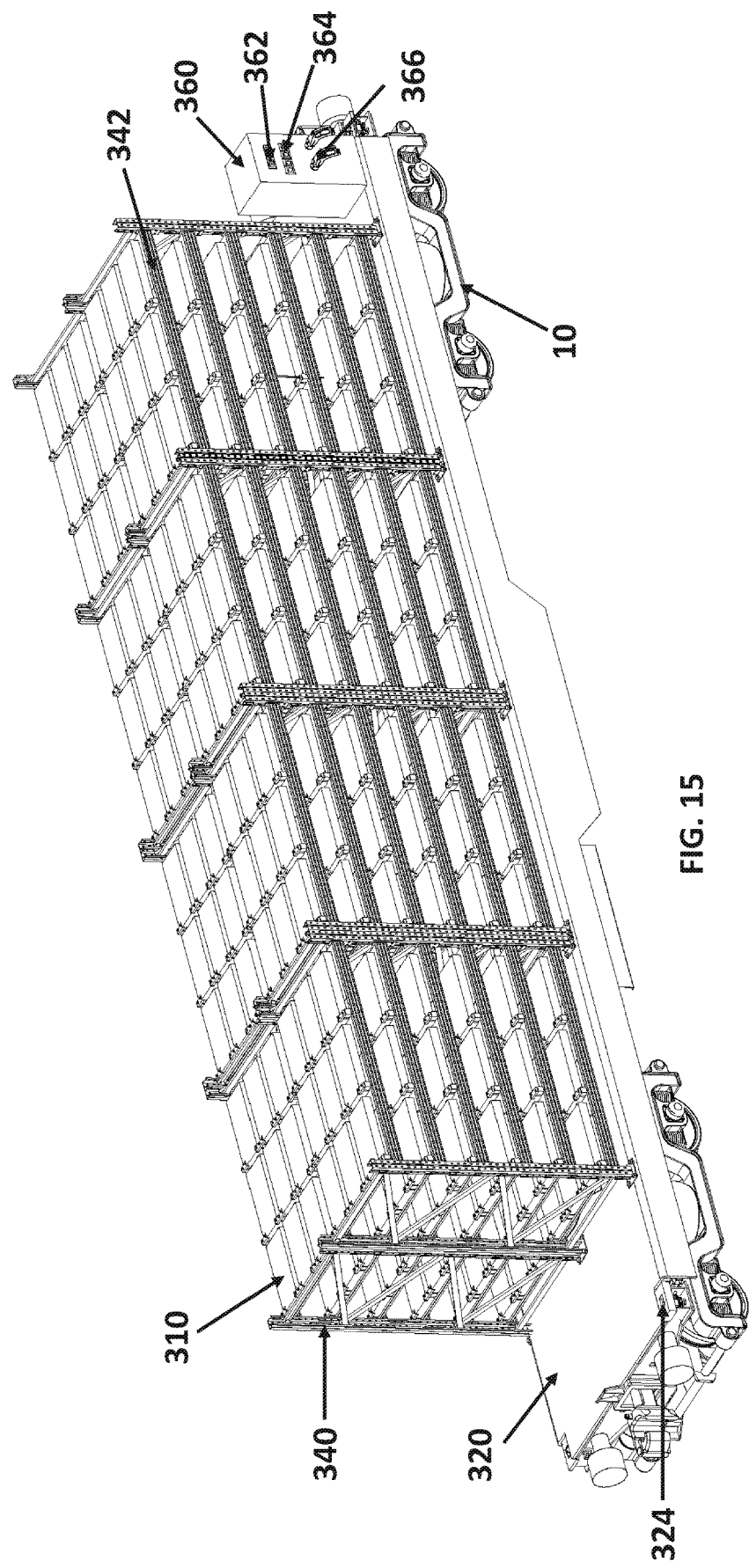
FIG. 15 is a perspective view of another embodiment of a storage arrangement for batteries utilizing racks.

FIGS. 14 through 17 illustrates various embodiments of battery storage arrangements for trains. As shown in the figures, it is appreciated that the batteries 310 may be stored within or on the underside of a train car platform 320 and/or within the train car 322 itself. FIG. 14 illustrates one embodiment of a plurality of batteries 310 attached or positioned on the underside of the train platform or wagon 320. While twenty-one batteries are shown on each side for a total of forty-two batteries, it is appreciated that a different number and arrangement of batteries may be utilized depending on the particular wagon and batteries utilized and not depart from the scope of the present invention.

The wagon 320 includes a plurality of twist locks 324 about its corners to allow it to be releasably attached to train bogies 10 having the energy generation systems 100 of the present invention. The platform may then be loaded with cargo or be part of a train car for carrying passengers or batteries. Examples of different types of containers that may be placed on top of the platform include, but are not limited to, hoppers, gondolas, flatcars, boxcars, reefers and tanker cars.

FIGS. 15 through 18 illustrate one embodiment of batteries being stored in racks 340 within the train cars 322. The racks 340 may include any number of levels or shelves 342 for storing batteries 310 in a variety of configuration including, but not limited to, horizontally along the width and or depth of the shelves.

The racks 340 may include feet 344 having a plurality of holes 346 therein to allow them to be bolted or otherwise secured to the top of the wagon 320. In order to increase storage capacity, the shelves of the rack may be positioned at different levels to provide tiers having various heights. Vertical posts 350 having a plurality of spaced openings 352 allow the shelves 342 to be adjusted to different heights as needed or desired to accommodate the batteries 310. Cross members 354 may extend along the sides and back of the rack between the posts 350 to provide support to the racks 340.

Figure 16:
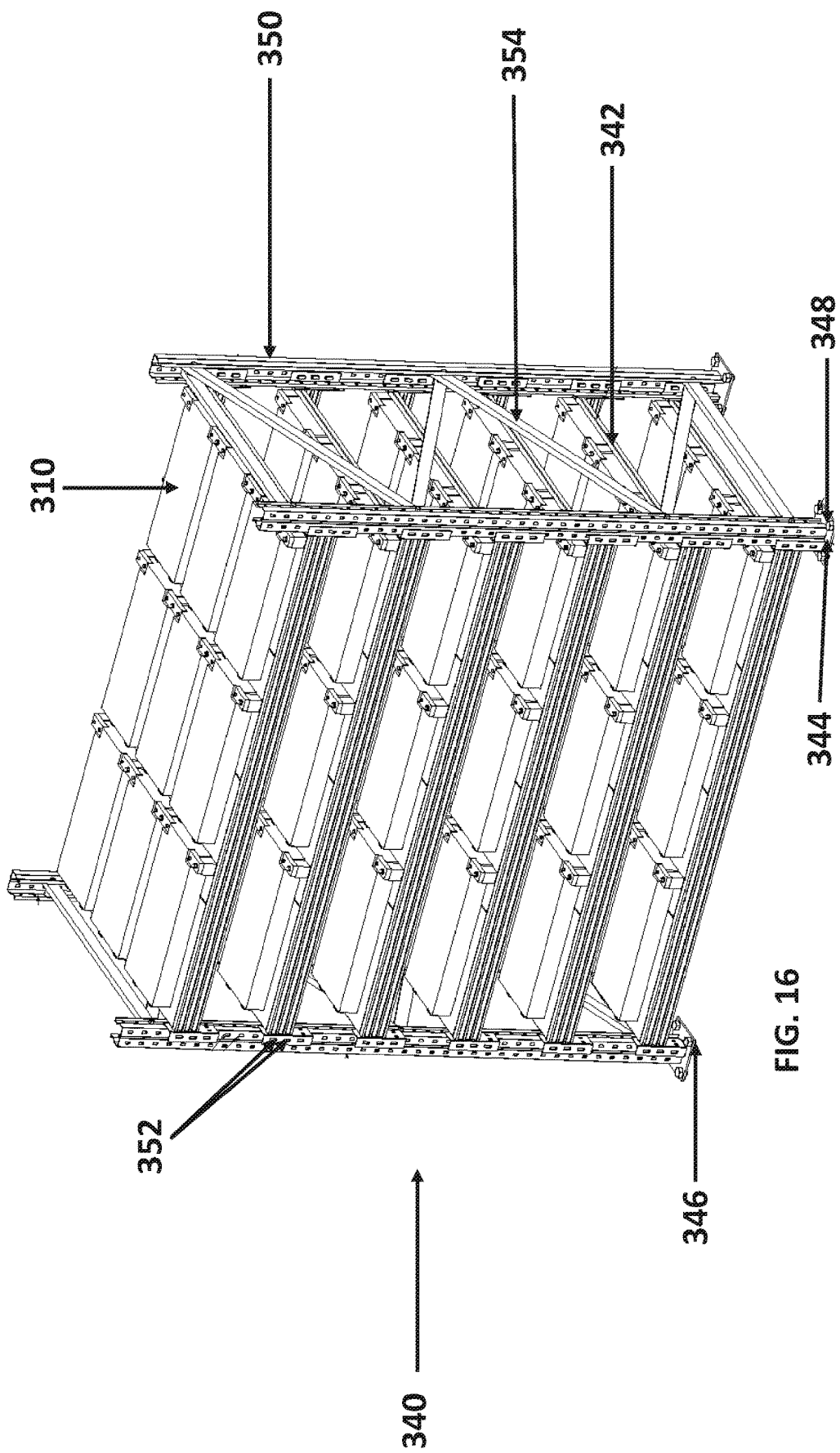
FIG. 16 is a perspective view of one embodiment of a rack for the storage of batteries.
Figure 17:
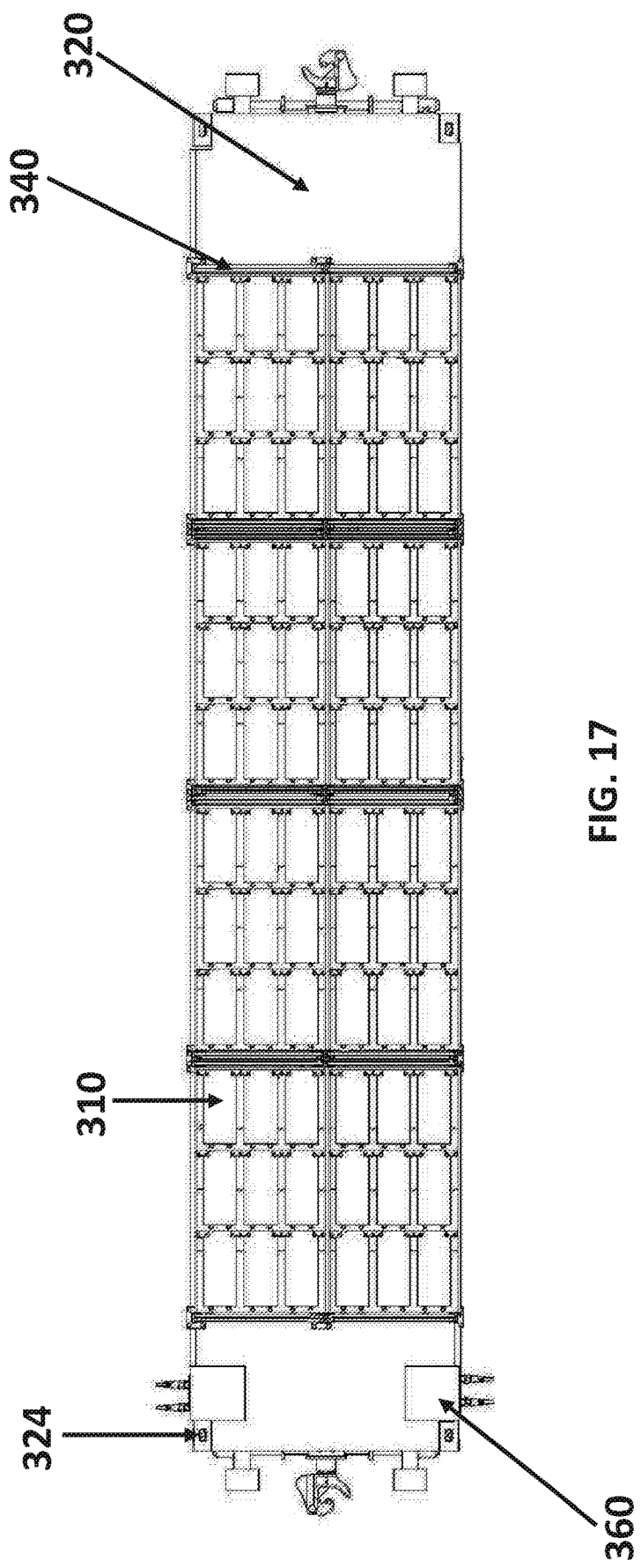
FIG. 17 is a top plan view the embodiment shown in FIG. 16.
Figure 18:
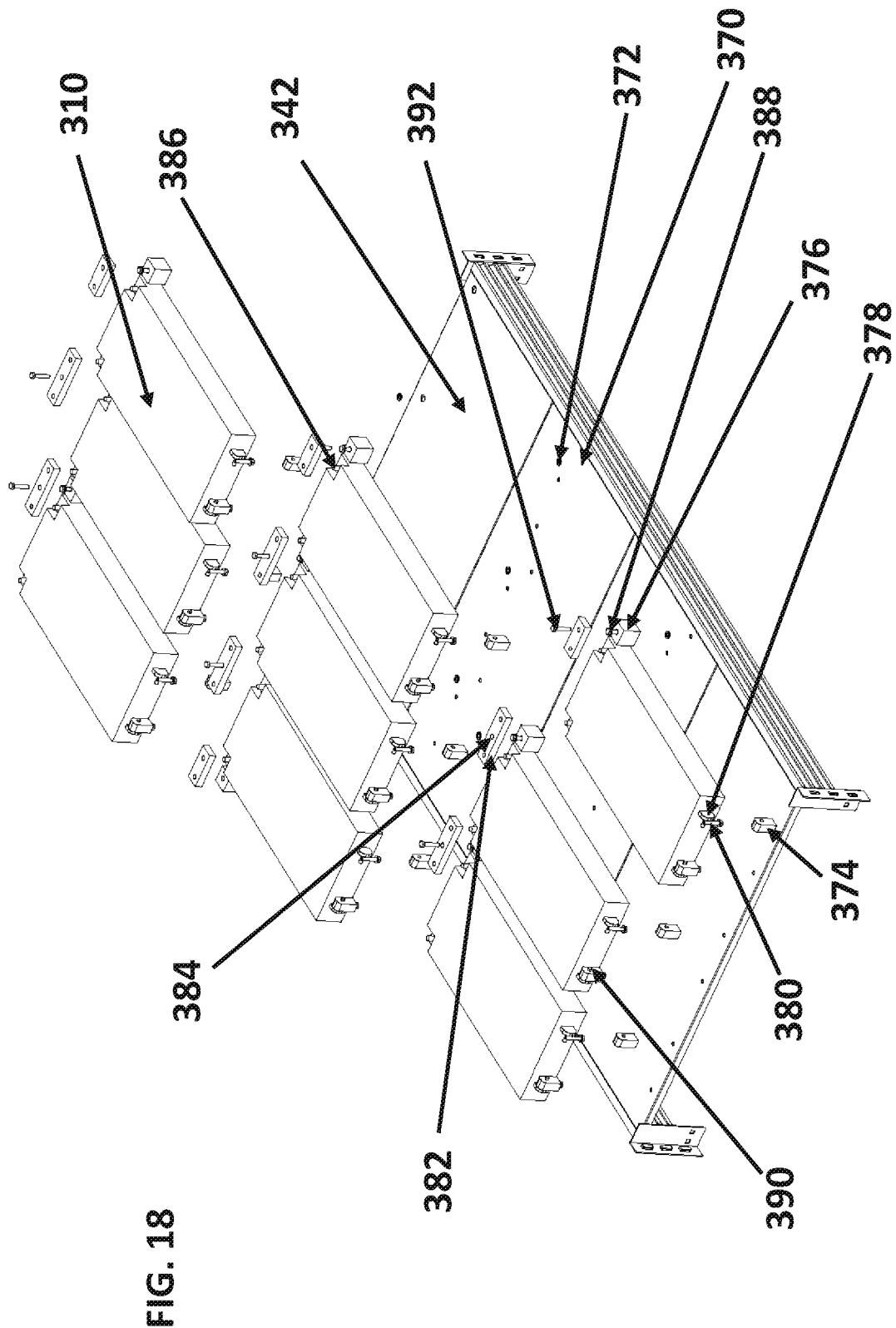
FIG. 18 is a partial exploded view showing a plurality of batteries attachable to one shelf of a rack.
Figure 19:
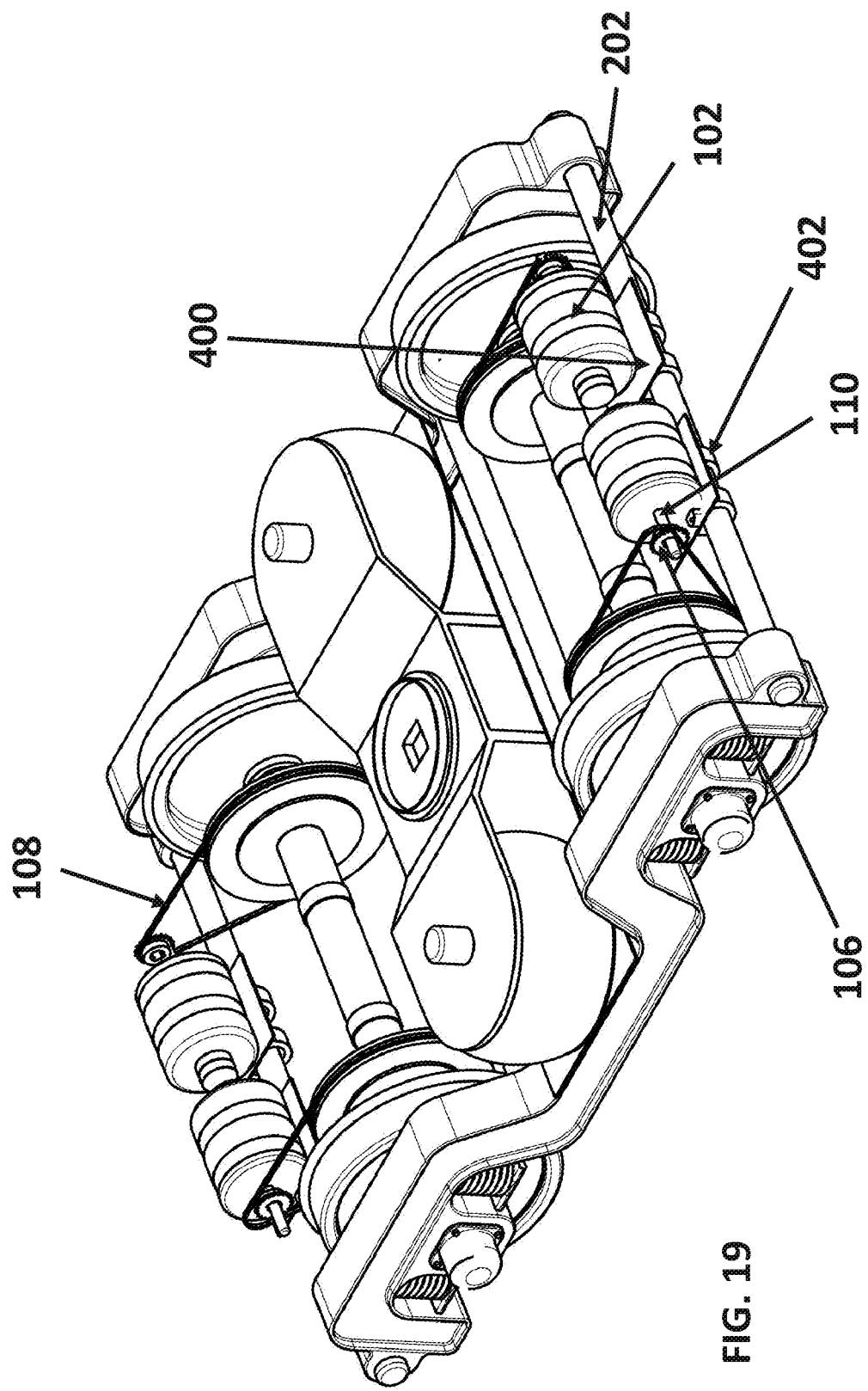
FIG. 19 is a perspective view showing another embodiment of the energy generation system of the present.

The example of a rack shown in FIG. 16 includes a plurality of shelves closely placed together to allow batteries to be stored flat as shown in FIG. 16. It is appreciated that the arrangement and height of the shelves may vary depending on a number of factors including the internal height of the train car and the particular dimensions and arrangement of the batteries.

The racks may be arranged in rows to permit multiple racks to be stored within a train car to increase or maximum battery storage capacity. Referring again to the embodiment shown in FIG. 15, a platform and/or train car could accommodate two rows of four racks each having six shelves of nine batteries for a total of four hundred and thirty-two batteries. If the storage capacity of a battery is 5 kWh that would amount to a total of 2,160 kWh of storage. It is appreciated that a single train car may store batteries within the car itself and/or the platform.

In order to retain the batteries 310 in place during movement of the train, they may be secured or attached to the shelves 342 of the rack 340 when stored. The shelving may include a plurality of spaced apart openings 370, 372 that allow a series of blocks or retaining members 374, 376 to be attached thereto through screws, bolts or other connectors. Corresponding retaining members or walls 378 extend from one end of the batteries 310 and include a pin or other connector 380 for removably inserting in corresponding opening in retaining member 374. The other end of the battery may include cut away portions at its corners that allows a plate or connecting member 382 having a plurality of holes 384 spaced apart thereon to attach to pin or post 386 extending thereto and a bolt or other connector 392 for connecting to retaining member 376. As shown, the plate 382 may include two or three holes 384 depending on whether it is attaching a single corner of a battery 310 or opposing corners of adjacent batteries 310.

It is appreciated that the train cars may include an energy distribution system that connects to the batteries to allow the stored power to be transmitted to other batteries, equipment or machines. The energy distribution system may include connectors and adapters for transferring power from the batteries 322 to the other batteries, equipment or machines. Referring again to FIG. 15, the adapters and connectors 362,364,366 may be included in panels 360 that may fits within the side of the train cars 322. The adapters and connectors may include but are not limited to 120V sockets 362, 220V sockets 364 and quick charging adapters 366 for fast charging of electric vehicle batteries. It is also appreciated that the batteries may be removed and replaced after charging for remote use.

A software application may be utilized to track the amount of energy being produced and stored in the batteries. The amount of energy that is consumed from the train from the generated energy may also be tracked to monitor and charge for its usage if desired. A telemetric device may be used to remotely transmit the information collected about the stored and used energy.

The preceding description and drawings merely explain the invention and the invention is not limited thereto, as those of ordinary skill in the art who have the present disclosure before them will be able to make changes and variations thereto without departing from the scope of the present invention.

The invention claimed is:

1. A system for the generation of energy in a train having disc brakes on axles within a train bogie, the system comprising:
   a disc brake rotor having a periphery and connectors positioned around its periphery, the connectors comprising a series of slots defined by elongated members having tapered ends;
   a generator;
   a support frame for positioning the generator within the train bogie; and
   a chain disposed about at least a portion of a circumference of the disc brake rotor that engages the connectors and a coupler member having a plurality of teeth for engaging the chain, wherein the chain engages the tapered ends of the elongated members.

2. The system of claim 1 wherein the generator is a pair of generators and the coupler member is a pair of sprockets.

3. The system of claim 1 which further comprises a bracket that maintains the coupler in position relative to the disc brake rotor.

4. The system of claim 1 which further comprises a clutch, the clutch selectively controlling the generation of energy by the generator.

5. The system of claim 1 where the support frame comprises a pair of rods extending parallel to the axle and a traverse frame member extending between the two rods proximate to the disc brake rotor.

6. The system of claim 5 wherein the traverse frame member comprises an upper frame member, a lower frame member and a pair of end members.

7. The system of claim 6 wherein the generator comprises a shaft that mechanically connects the generator to the coupler and wherein at least one of the upper frame member and the lower frame member comprises an opening to rotatably receive the shaft.

8. A system for the generation of energy in a train having disc brakes on axles within a train bogie, the system comprising:
   a disc brake rotor having a periphery and connectors positioned around its periphery;
   a generator;
   a support frame for positioning the generator within the train bogie, the support frame comprising:
      a pair of rods extending parallel to the axles; and
      a traverse frame member extending between the two rods proximate to the disc brake rotor;
   a chain disposed about at least a portion of a circumference of the disc brake rotor that engages the connectors and a coupler member having a plurality of teeth for engaging the chain; and
   a connecting member mechanically connecting the generator to the coupler member.

9. The system of claim 8 wherein the connectors comprises a series of slots.

10. The system of claim 9 wherein the series of slots are defined by elongated members having tapered ends and wherein the chain engages the tapered ends of the elongated members.

11. The system of claim 9 wherein the generator is a pair of generators and the coupler member is a pair of sprockets.

12. The system of claim 9 which further comprises a bracket that maintains the coupler in position relative to the disc brake rotor.

13. The system of claim 9 which further comprises a clutch, the clutch selectively controlling the generation of energy by the generator.

14. The system of claim 9 wherein the traverse frame member comprises an upper frame member, a lower frame member and a pair of end members, wherein at least one of the upper frame member and the lower frame member comprises an opening to rotatably receive the connecting member.

15. A system for the generation of energy in a train having disc brakes on axles within a train bogie, the system comprising:
   a disc brake rotor having a periphery and connectors positioned around its periphery;
   a generator;
   a support frame for positioning the generator within the train bogie, the support frame comprises a pair of rods extending parallel to the axle and a traverse frame member extending between the two rods proximate to the disc brake rotor; and
   a coupler for mechanically connecting the generator to the connectors on the disc brake rotor, the coupler comprises a chain disposed about at least a portion of a circumference of the disc brake rotor and a coupler member having a plurality of teeth for engaging the chain.

16. The system of claim 15 wherein the connectors comprises elongated members having tapered ends and wherein the chain engages the tapered ends of the elongated members.

17. The system of claim 15 wherein the generator comprises a connecting member that mechanically connects the generator to the coupler.

18. The system of claim 17 wherein the connecting member is a shaft.

19. The system of claim 17 which further comprises a bracket that maintains the coupler in position relative to the connecting member of the disc brake rotor.

20. The system of claim 15 wherein the connectors comprise a series of slots and the coupler comprises a coupler member having a plurality of teeth for engaging the slots.

21. The system of claim 15 which further comprises a bracket that maintains the coupler in position relative to the connectors of the disc brake rotor.

22. The system of claim 15 which further comprises a clutch, the clutch selectively controlling the generation of energy by the generator.

23. The system of claim 15 wherein the traverse frame member comprises an upper frame member, a lower frame member and a pair of end members.

24. The system of claim 23 wherein the generator comprises a shaft that mechanically connects the generator to the coupler and wherein at least one of upper frame member and the lower frame member comprises an opening to rotatably receive the shaft.

\* \* \* \* \*